United States Patent [19]

Brininstool

[11] Patent Number: 4,685,799

[45] Date of Patent: Aug. 11, 1987

[54] INTEGRATED OPTICAL TIME DOMAIN REFLECTOMETER/INSERTION LOSS MEASUREMENT SYSTEM

[75] Inventor: Michael R. Brininstool, San Diego, Calif.

[73] Assignee: The United States of America as represented by the Secretary of the Navy, Washington, D.C.

[21] Appl. No.: 818,293

[22] Filed: Jan. 13, 1986

[51] Int. Cl.[4] ...................... G01N 21/84; G01N 21/88
[52] U.S. Cl. .................................................... 356/73.1
[58] Field of Search ....................................... 356/73.1

[56] References Cited

U.S. PATENT DOCUMENTS

| | | | |
|---|---|---|---|
| 4,081,258 | 3/1978 | Goell et al. | 356/73.1 X |
| 4,360,268 | 11/1982 | Zucker et al. | 356/73.1 |
| 4,391,517 | 7/1983 | Zucker et al. | 356/73.1 |
| 4,397,551 | 9/1983 | Bage et al. | 356/73.1 |
| 4,468,117 | 8/1984 | Hartouni et al. | 356/73.1 |
| 4,497,575 | 2/1985 | Philipp | 356/73.1 |

FOREIGN PATENT DOCUMENTS 60-85351   5/1985   Japan ................................. 356/73.1

OTHER PUBLICATIONS

Kashyap et al., "Measurement of Strain Relief in an Experimental Optical Fibre Cable" Electronics Letters, Mar. 18, 1982, vol. 18, #6, pp. 263-265.

Primary Examiner—Vincent P. McGraw
Attorney, Agent, or Firm—Robert F. Beers; Ervin F. Johnston; Thomas Glenn Keough

[57] ABSTRACT

A combination optical time domain reflectometer (OTDR) and insertion loss measurement system evaluates environmental stress effects on a test fiberoptic cable. A multiport coupler joins the OTDR and insertion loss system to the test fiberoptic cable via a precursor of like type and length with respect to the test cable. Nondestructive analysis, continuously and throughout, measures attenuation between any two points within the equilibrium region of the test cable, the quality of the splice between the precursor and the test cable and the degree of EMD disruption. Attenuation measurements over operating environmental conditions can be made to precisely determine the maximum allowable cable length. Visual readouts and permanent records of the EMD disruption and resultant excess attenuation provide real time analysis so that responsive corrective actions can be made.

7 Claims, 5 Drawing Figures

INTEGRATED OPTICAL TIME DOMAIN REFLECTOMETER/INSERTION LOSS MEASUREMENT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Ongoing advances in optical fiber and fiberoptic cable development are resulting in further reductions in both fiber attenuation and excess attenuation caused by cabling processes and environmentally-induced microbending. State-of-the-art fibers are evolving such that multi-mode graded-index fibers exhibit attenuation values as low as 0.5 dB/Km at 1.3 microns. With such greatly improved fibers conventional measurement systems need to be improved to provide for highly precise and accurate measurements.

The parameter of cable attenuation together with the maximum change in attenuation over the operating environmental conditions may be the primary factor that determines the maximum allowable cable length. For example, given as a design parameter a 30 dB cable loss margin, a cable with a maximum attenuation of 0.5±0.04 dB/Km at 1.3 microns can be from 55.5–65.2 Km long, neglecting splices. The shortest length, 55.5 Km would be chosen because of the ± uncertainty. For comparison, if the uncertainty was ±0.125 dB/Km then the same cable would be 0.5±0.125 dB/Km at 1.3 microns. For the 30 dB loss margin, the system length would range from 48–80 Km and the shortest length, 48 Km would have to be used to provide for determinable reliability. Now, let the design allow for a cable loss margin of 50 dB as in the case with some laser systems. Given a 0.5 dB/Km cable, the system length for a ±0.04 dB/Km uncertainty is 92.6 Km while for a ±0.125 dB/Km uncertainty, the length is reduced to 80 Km. Summarizing the importance of measurement precision, a large measurement uncertainty ultimately results in a substantial reduction in system range. In like manner when losses or other parameter changes are caused by an expected range of pressure, temperature or strain fluctuations, an overall system length reduction and other adjustments need be made in order to have a satisfactorily operating system. These parameters, when precisely predetermined, greatly aid a designer and ultimately produce the most efficient, and, therefore, cost effective, systems.

Thus, there is a continuing need in the state-of-the-art for an apparatus which makes accurate and precise attenuation measurements on both cabled and uncabled multi-mode, graded-index fibers and simultaneously includes features of two measurement systems, the optical time domain reflectometer (OTDR) and the throughput loss system by integrating them via a fiber-optic coupler.

SUMMARY OF THE INVENTION

The present invention is directed to providing an apparatus for evaluating environmental stress effects on a test fiberoptic cable. An OTDR and a throughput loss (insertion loss) measurement system are joined via a common multiport coupler to a test optical fiber. An equilibrium modal distribution launcher or precursor of like type and length as the test fiber is interposed between the coupler and the test cable to allow insertion loss measurement of a second wavelength emitted by the throughput loss (insertion loss) system of the test fiber which is already excited by a first wavelength of energy from the OTDR.

A prime object of the invention is to provide a nondestructive means for evaluating environmental stress effects on a test fiberoptic cable.

Another object is to provide for a testing of a fiberoptic cable under laboratory controlled varying conditions and correlating the same on a real time display.

Still another object is to provide for determination of cable attenuation including an indication of change in attenuation over operating environmental conditions to determine the maximum allowable length of the cable.

Still another object is to provide for an apparatus for measuring attenuation between any two points within the equilibrium region of a sample.

Still another object is to provide for a system for determining the quality of a splice between a precursor and a test section of cable, for example, an indication of the magnitude of the coupling loss, conservation of equilibrium modal distribution, the magnitude of equilibrium modal distribution disruption as well as determining the distance required to bring the disrupted distribution into cable equilibrium.

Yet a further object is to provide for a combined system having the accuracy of the OTDR and the precision of the insertion loss system.

Still another object is to provide for a combined OTDR system and insertion loss system employing a coupler having a ratio chosen to conserve as much OTDR laser power as possible.

Still yet another object of the integrated system is to use the OTDR to determine if an acceptable conservation of the equilibrium modal distribution launched through the precursor/cable splice has been established prior to making insertion loss measurements.

These and other objects of the invention will become more readily apparent from the ensuing specification when taken with the appended claims and the accompanying drawings.

DESCRIPTION OF THE PREFERRED EMBODIMENT

Figure 1:
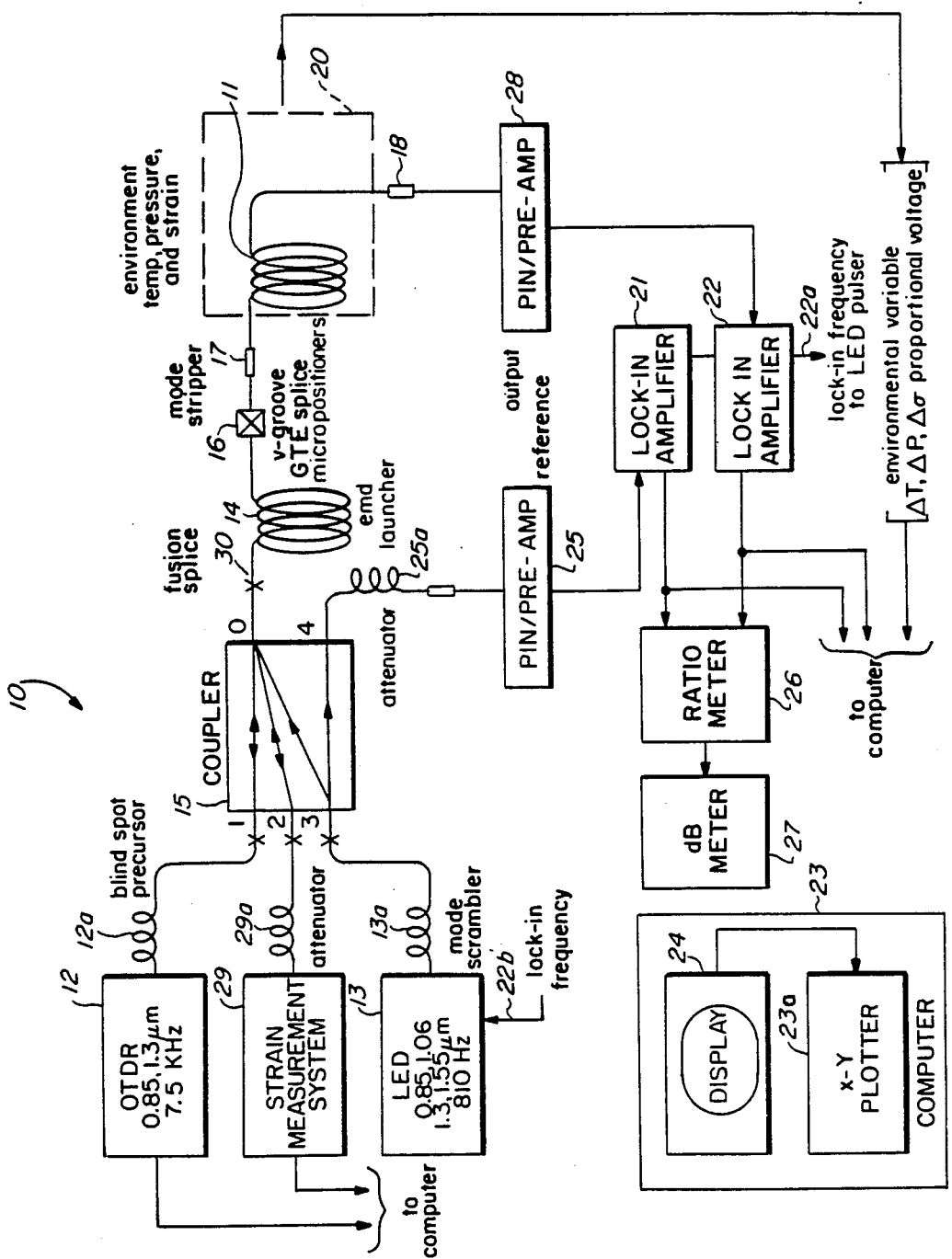
FIG. 1 depicts a block diagram form of the integrated OTDR/throughput loss (insertion loss) measurement system of this inventive concept.

This invention advantageously includes salient features of two proven optical fiber measurement systems, an OTDR and throughput loss (insertion loss) system, and combines them through a fiber coupler. These systems are novelly incorporated in a manner which advances the state-of-the-art with respect to making accurate and precise attenuation measurements in both cables and uncabled multi-mode graded-index fibers.

A common technique used for measuring excess loss in a cabled optical fiber involves recording the change in optical throughput power or insertion loss detected at the fiber output as a test cable is subjected to environmental stresses. These stresses can include cabling processes, installation, deployment, change in temperature or hydrostatic pressure and strain. Several factors have been found to cause excess losses but the major contribution is the phenomena of microbending.

Microbending couples modes propagating in the core of the fiber into radiative cladding modes, resulting in an increase in attenuation. Excess attenuation is calculated by dividing the dB change in optical power output relative to room temperature power output by the length of the cable sample under test. Incorporating radiometric techniques, where the source radiation drift is divided out of the measurement, and housing the temperature sensitive components in a thermally stable enclosure results in a highly precise system with the stability of ±0.01 dB over a twenty-four hour period.

Accuracy of the throughput loss system is measured by how closely results derived from relatively short (0.5 to 1 kilometer) test samples predict, through extrapolation, actual losses of a system employing several kilometers of cable. Keeping the test samples as short as possible allows an adequate number of tests to be run while holding the costs down. To achieve accurate extrapolation, the modal power distribution within the entire test sample must be identical to that propagating within the system length. This condition, referred to as the steady-state or equilibrium modal distribution (EMD) is met when attenuation within a fiber is independent of length. Transient, length-dependent loss or differential mode attenuation typically appears near the fiber input and is due to the launching of leaking, cladding and/or higher-order mode groups, which are easily coupled to radiative modes. For a test sample containing a region of transient, non-steady-state loss, extrapolation errors of several dB per kilometer can result that often pessimistically predict excess attenuation values.

To achieve an EMD that propagates through the entire test sample, several techniques have been developed that are discussed in the article by L. G. Cohen et al entitled "Experimental Techniques for Evaluation of Fiber Transmission Losses and Dispersion," *Proceedings of the IEEE*, Vol. 68, No. 10, October 1980, pp. 1203–1209. Some designed EMD launchers are connected between a light source and a test fiber input. The EMD available at the launcher output is injected into the test fiber. Some typical launchers include a long (greater than 500 meters) precursor or "dummy" fiber similar to the test sample. The article by R. B. Kummer in his article entitled "Observation of a Cascade Effect for Optical Fiber Splices," *Digest Topical Meeting on Optical Fiber Communications*, Washington, D.C. March, 1979 paper ThE2 and M. Tateda et al in their article entitled "Optical Loss Measurement in Graded-Index Fiber Using a Dummy Fiber," *Applied Optics*, Vol. 18, No. 19, Oct. 1, 1979, pp. 3272–3275 provide examples of this EMD launcher. A second EMD launcher employs a beam optics technique referred to as the limited-phase-space method which excites 70% of the fiber numerical aperture and 70% of the core diameter. This technique is explained by D. L. Frazen et al in "Result of an Interlaboratory Measurement Comparison Among Fiber Manufacturers to Determine Attenuation, Bandwidth, and Numerical Aperture of Graded-Index Fibers," *Digest of Topical Meeting on Optical Fiber Communications*, Washington, D.C., March 1979, paper TUK. Another EMD launcher is an etched fiber end face that diffuses and mixes the input distribution as discussed in the article by M. Ikeda et al in their article "Multimode Optical Fibers: Steady-State Exciter," *Applied Optics*, Vol. 15, No. 9, September 1976, pp. 2116–2120. Another EMD launcher employs a mandrel wrap where a fiber is coiled five times around a 1.3 centimeter mandrel. P. Kaiser discussed such a technique in his article entitled "Loss Measurements of Graded-Index Fibers: Accuracy vs. Convenience," *Proceedings of NBS Symposium on Optical Fiber Measurements*, Boulder, Colo., Oct. 28–29, 1980. And, lastly, a design constructed of a meter of step-index fiber fusion welded to a meter of graded-index fiber and welded to another meter of step-index fiber provided yet another EMD launcher as disclosed by W. F. Love in his article entitled "Novel Mode Scrambler for Use in Optical-Fiber Bandwidth Measurements," *Digest of Topical Meeting on Optical Fiber Communications*, Washington, D.C., March 1979, paper ThG2. All of the above referred to EMD launcher techniques have been more or less successful at generating an EMD.

Other approaches shorten the length reuired to bring about steady-state in the test fiber by inducing microbending directly on the test fiber input. This rapidly scrambles and strips lossy modes in a very short distance. Several methods are used to achieve this. M. Eve et al in their article entitled "Launching Independent Measurements of Multimode Fibers," *Proceedings of the Second European Conference on Optical Communications*, Paris, 1976, pp. 143–146 discusses the sandwiching of a fiber input between sheets of abrasive paper such as sandpaper and applying lateral pressure. The threading of an unbuffered fiber end through an S-shaped channel filled with index matching fluid was disclosed by F. T. Stone et al in their article entitled "Effects of Different Mode of Filters on Optical-Fiber Measurements," *Digest Topical Meeting on Optical Fiber Communications*, Washington, D.C., March 1979, paper ThG4 and F. T. Stone et al in their article entitled "Mode Elimination Fiber Loss Measurements," *Applied Optics*, Vol. 118, No. 6, Mar. 15, 1979, pp. 756–758. Lastly, G. Zeidler in his article "Effects of Mechanically Induced Periodic Bends on the Transfer Characteristics of Glass Fibers," *Proceedings of the 2nd European Conference on Optical Communications*, Paris, 1976, pp. 105–109 discloses the impressing of microbending onto the test fiber input with opposing sets of teeth of carefully selected spatial periods.

While all of these methods mentioned in the preeceding paragraph are effective at stripping off unusually lossy modes launched into the test fiber, many do not successfully establish an EMD. In addition, when considering cabled fibers, the mode scramblers or filters are very difficult to implement due to the tedious effort involved in stripping away the various protective armor layers. Thus, for cabled fiber testing, the FMD launchers are preferred. With the exception of the limited-phase-space method, which is susceptible to instabilities, the launchers rely on coupling the modal power distribution into the fiber via a splice. The splice could be made using V-grooves, micropositioners, or an elastomeric coupling.

It has been shown that an improperly aligned splice can cause mode mixing and, consequently, the EMD is not successfully transferred into the test sample, see the above referred to article by B. Kummer as well as the article by P. Kaiser entitled "Transmission Losses of Concatenated, Connectorized Fiber Cables," *Digest of Topical Meeting on Optical Fiber Communications,* Washington, D.C., March 1979, paper TuE3 and K. S. Gordon "Impact of Joins on the Design of Optical-Fiber Systems," *Digest of Topical Meeting on Optical Fiber Communications,* Washington, D.C., March 1979, paper ThE1. Imperfect end cleaves can also cause mode conversion. The modal power distribution available at the output of the test sample reveals nothing about the existence or absence of a transient, non-steady-state region within the fiber front end. It is, therefore, necessary to have a technique for analyzing the degree of EMD disruption at the splice interface. The OTDR accomplishes this. In this way corrective measures can be taken prior to initiating environmental tests.

Integrating the OTDR system into the throughput loss measurement system first requires an understanding of the OTDR. Simply stated it is this. It is a valuable tool for non-destructively analyzing optical fiber attenuation. It provides a display of backscattered power in a fiber in a length-continuous manner. This capability was brought out in the article by M. K. Barnoski entitled "Fiber Waveguides: A Novel Technique for Investigating Attenuation Characteristics," *Applied Optics,* Vol. 15, No. 9, September 1976, pp. 2112–2115. It has also been found that the OTDR can be used to measure differential modal attenuation, see the article by M. K. Barnoski et al entitled "OTDR Differential-Modal-Attenuation Measurements," *Proceedings on the 4th European Conference on Optical Communications,* Geneva, 1978, pp. 133–139 and S. M. Jensen "Observation of Differential Mode Attenuation in Graded-Index Fiber Waveguides Using OTDR," *Digest of Topical Meeting on Optical Fiber Communications,* Washington, D.C., March 1979, paper ThG3. Thus the OTDR is a sensitive apparatus for depicting EMD disruption due to a splice. By integrating the OTDR into the throughput loss system, a technique and apparatus for evaluating the disruption or conservation of the EMD across a splice prior to initiating testing are realized.

Referring now to FIG. 1 the integrated OTDR/insertion loss measurement system 10 is fabricated to monitor select properties of a test fiber 11. A fiber optical coupler 15 is used to simultaneously direct light pulses from a laser in an OTDR system 12 and from an LED in a throughput loss system 13 into the input of an EMD launcher 14. A coupler 15 is included to alleviate errors which might result from interchanging the LED input from the throughput loss system and the OTDR signal inputs to EMD launcher 14. A typical OTDR suitable for this application is an ANRITSU Model MW98A that is manufactured by ANRITSU Electric Co., Ltd. of Tokyo, Japan. A suitable LED for the throughput loss system is a Model T-7643 marketed by ITT Electrooptic Products Division of Roanoake, Va.

The EMD launcher is a like length of a substantially identical fiber to the fiber 11 under test within an environmental conditioning apparatus 20. The environmental conditioning apparatus is a device which varies the temperature, pressure or strain on the fiber under test so that its environmental stress effects can be monitored by the improved measurement system of this invention. The environmental conditioning apparatus is of a well proven design having precisely controlled and monitored heater and/or cooling coils in the proximity of the test cable or has pressurized fluid sources or clamping or tensile stress devices to vary the pressure or strain as desired for predetermined periods of time and have appropriate outputs for a computer 23 described below.

Figure 2:
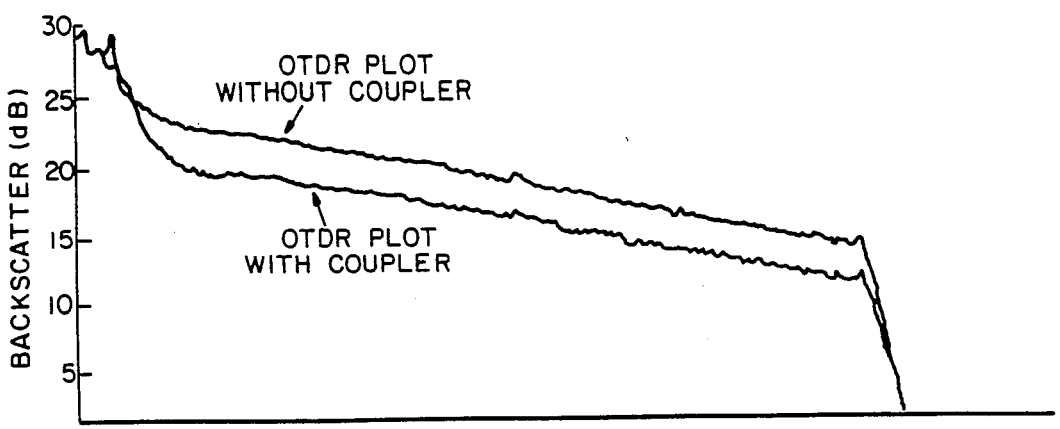
FIG. 2 is a graph showing the fiberoptic coupler evaluation.

The coupler 15 selected for this application is a Model PC4-A-050 commercially marketed by Canstar Communications of Scarborough, Canada. All of the coupler port connections are fusion welded to improve stability and provide for the light directions and couplings as noted by the arrows in FIG. 1. The coupler used for the prototype system is a 4-port fuxed-taper coupler having a 15:1 coupling ratio. The 3×2 coupler shown in FIG. 1 is used when a strain measurement is required simultaneously. The reported insertion loss between direct-line ports 1 and 0, 3 and 4 is 1.2 dB and the loss between cross-line ports 3 and 0, 1 and 4 is 14 dB. The least-lossy, direct-line coupler path was assigned to the OTDR while the LED light travels the indirect path, since the OTDR has a much lower dynamic range than the LED system. Another reason for this path selection concerns mode mixing. It has been discovered that the backscatter modal distribution can be effected by a tapered region, such as that within a fused-taper coupler, with a resultant error in the measured attenuation level, see the article by A. J. Conduit et al entitled "Optical Fiber Diameter Variations and Their Effect on Backscatter Loss Measurements," *Electronics Letters,* Vol. 17, No. 8, Apr. 16, 1981, pp. 308–310. However, fibers within a 15:1 coupler are subjected to very little tapering in order to achieve the low-coupling efficiency. Thus the backscattered modal distribution is minimally disturbed as it passes through the coupler along the direct route. To confirm this a comparison was made between OTDR plots taken of a precursor connected to a cable with and without coupler 15 inserted. The results are shown in FIG. 2. The plots show that other than generating a 1.4 dB one-way loss the coupler has no measureable effect on the backscattered power distribution. It is to be noted that these parameters are as stated with the chosen coupler above. Variations and suitable compensation will be included in a manner obvious to one skilled in the art to accommodate other couplers from different manufacturers.

The OTDR signal rejection at the test sample output is achieved by lock-in amplifiers 21 and 22. Two Model 393's manufactured by Ithaco, Inc. of Ithaca, N.Y. were selected for this purpose. The lock-ins reject the OTDR signal by locking to the LED pulse frequency via a suitable connection 22a through 22b. As an added precaution, the LED pulse frequency is chosen so as not to coincide with any 60 Hz or 7.5 KHz (OTDR pulse rate) harmonics.

An additional 5 dB rejection of unwanted 0.85 micron OTDR laser energy is accomplished by using germanium detectors for the 1.3 and 1.5 micron throughput loss measurements in LED 13 of the throughput loss system. A computer 23 is a Micro Angelo having a computer X-Y plotter 23a, Model HP 7225B by Hewlett Packard of Palo Alto, Calif., and controls the OTDR. It is also used to process and display the OTDR and throughout loss data on a Model 950 display 24 that is marketed by Televideo Systems of San Jose, Calif.

A blind spot precursor 12a is included at the OTdR output port and is simply a fiber whose length is long enough to allow for the OTDR receiver to come out of saturation caused by initial front end reflections. A fiber is coupled to the input of coupler port 3 in the form of a mode scrambler 13a that is used at the LED ouput to distribute the light evenly prior to coupler stripping and to improve the efficiency of coupling light into the EMD launcher.

In addition to integration, coupler 15 is also used to direct a portion of the LED light to a reference detector 25. The PIN diode is a Model J-16-5 manufactured by Judson Infrared, Inc. of Montgomeryville, Pa. and its associated amplifier is a Model 164 manufactured by Ithaco, Inc. of Ithaca, N.Y. and when used in conjunction with a ratio meter 26 is used to divide out source fluctuations. An attenuator 25a, a length of fiber, is included to eliminate saturation effects for the PiN receiver in reference detector 25.

In this regard, the PIN/PRE-AMP constituency of reference detector 25 is substantially identical to the PIN/PRE-AMP combination of a detector 28. Elements 25 and 28 function to provide optical-to-electrical signals to be fed to the lock-in amplifiers so that appropriate driving signals can be given to ratio meter 26 and its interconnected dB meter 27 as well as to computer 23. The ratio meter is a Model 3512 by Ithaco, Inc. of Ithaca, N.Y. and the dB meter is a Model 8050A by John Fluke Mfg. Co. of Everett, Wash. As mentioned above, circuits 25 and 28 along with lock-in amplifier 21 and 22 feed signals to the ratio meter in accordance with well known radiometric techniques where source radiation drift is divided out of measurement.

By employing a multiport coupler 15 the optical measurement system is designed to measure fiber strain as explained in the article of M. R. Brininstool entitled "Techniques for Measuring Longitudinal Strain in Graded-Index Optical Fibers," *SPIE Proceedings, Fiberoptics: Short-Haul and Long-Haul Measurements and Applications III*, Vol. 559, San Diego, Calif. Aug. 21–22, 1985. A typical fiber strain measurement system 29 as discussed by Mr. Brininstool is integrated into the overall setup. It is coupled to port 2 of coupler 15 and an attenuator 29a, a length of fiber, is used to eliminate saturation effects. Signal separation at the test sample output is achieved by means of a dichroic filter passing LED light while reflecting the light transmitted by the strain system 29. A 0.85 micron source is used for the strain system because this wavelength is seeing less and less use in contemporary loss measurements and the source would not have to be changed out every time a different wavelength LED source was used.

In a typical application of the system described above, excess attenuation measurements were performed on a fiberoptic microcable and emphasized the utility of such an integrated system. A 750 meter cable sample 11 was loosely coiled and placed inside a microprocessor-controlled temperature chamber 20. A like length and type of the test fiber was included as EMD launcher 14. It was fusion spliced at one end and a GTE elastomeric splice 16 was used to couple the launcher to the fiber under test. Mode strippers 17 and 18 were included at opposite ends of the test fiber. Mode strippers (otherwise referred to as cladding mode strippers) in the form of Corona dope paint in lengths of about two inches long were included to avoid launching cladding light into the test fiber and to avoid measuring cladding light at the output.

The cable under test was temperature cycled several times prior to the tests to reduce effects due to initial thermal shock. The both ends brought outside the chamber were cladding-mode stripped as outlined above and one of the cladding-mode stripped ends was positioned via a tapered glass tube directly above a PIN photodiode detector 28. The other end of the test fiber was also classing-mode stripped and coupled to the EMD launcher 14 via elastomeric splice to an 850 meter dummy fiber precursor used as the EMD launcher.

The test room temperature was maintained within a few degrees, however the EMD launcher was found to be very sensitive to thermally induced attenuation changes. Since power fluctuations resulting from these attenuation changes cause systematic measurement errors, the precursor was subsequently housed inside an insulated box, not shown, to serve as a thermal ripple filter and smooth out room temperature variations and thereby stabilize indications of the effects on the fiber under test.

Coupler 15 demonstrated no measurable dependence on room temperature for the thermal range maintained in the test room. Prior to initiating the test, the equipment was turned on and allowed to operate for several days. A stability of 0.01 dB over twenty-four hours was measured.

Figure 3:
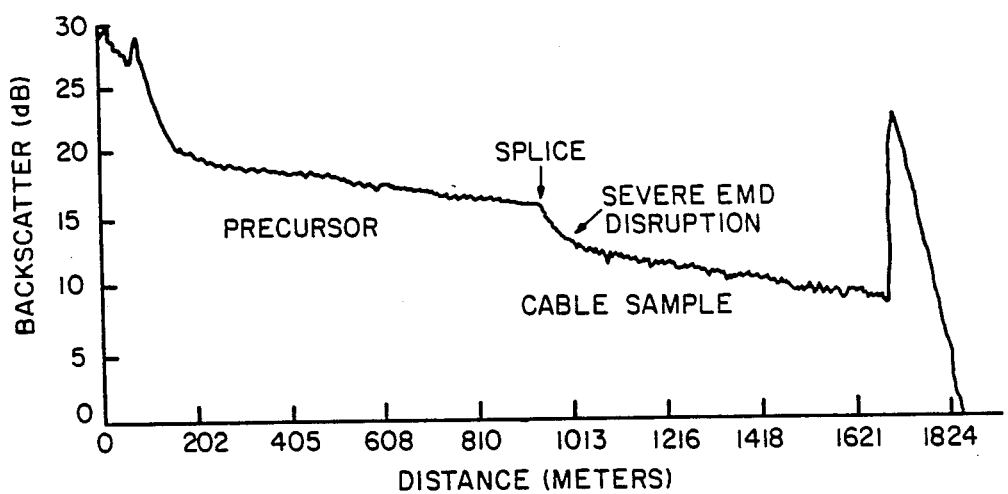
FIG. 3 is a graphical representation of the OTDR plots of precursor/sample with equilibrium modal distribution disruption.

The following test results shown in FIG. 3 illustrate the errors that arise when the EMD is not conserved across the launcher/sample interface. The integrated system was used to evaluate the EMD disruption. Corrections were made and an accurate measurement of attenuation was achieved.

Figure 5:
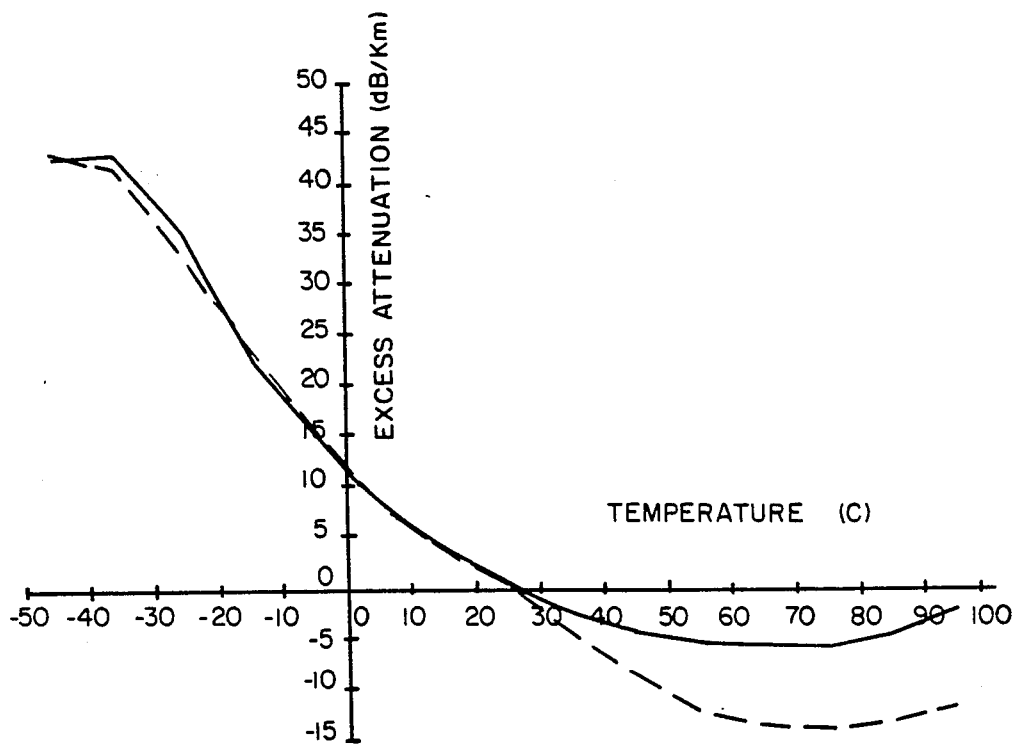
FIG. 5 is a graphical representation of the excess attenuation vs. temperature for two launch conditions.

FIG. 3 is an OTDR plot of the precursor fiber of the EMD launcher 14 coupled to cable sample 11. As shown the precursor is propagating an EMD throughout the latter half of its length. An EMD disruption was intentionally generated at splice 16. The disruption was created by using a chipped cleave on the cable input end face and by reducing the amount of index-matching gel applied to the two fiber ends. Steady state was not reached until roughly 150 meters from the test fiber input so transient losses dominated 20% of the sample length. While the distribution was quite severe it served to magnify the resultant excess attenuation error. The dashed curve in FIG. 5 depicts the averaged results of temperature cycling on the cable sample with the EMD disrupted. The cable exhibits a decrease in attenuation with increasing temperature up to roughly 75° where a minimum occurs. The plot shows almost a 15 dB/Km reduction in excess attenuation at 75° C. However, the fiber attenuation at room temperature before cabling was 3.2 dB/Km and after cabling was 9.1 dB/Km. These values offer the first clue that the results of temperature cycling with the perturbed EMD are definitely wrong. The results are due entirely to transient loss effects and the results of extrapolation to 1 Km. Without the use of the integrated system to minimize the EMD disruption, several worthless tests could have been run before an error such as this would be detected. Worse yet, for environmental tests where the attenuation is expected to increase with applied stress, such as with pressure increases or temperature reductions, errors could go unnoticed and be recorded simply as pessimistic excess attenuations.

Figure 4:
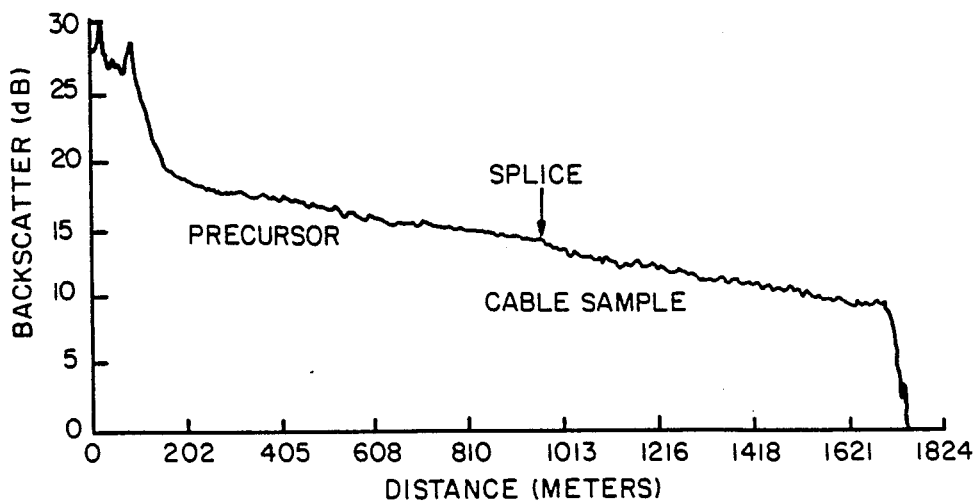
FIG. 4 is a graph depicting the OTDR plot of precursor/sample with equilibrium modal distribution disruption minimized.

FIG. 4 is an OTDR plot of the same precursor/cable pair with the EMD disruption effectively eliminated. Average temperature results using the improved EMD transfer are shown as a solid line in FIG. 5. A high level of confidence can be placed on these results since the OTDR revealed an EMD propagating along the entire sample length. The excess attenuation relative to room temperature for this launch condition was reduced by 6.3 dB/Km at 75° C. The temperature increase eliminates the cabling loss effects probably through reduced microbending. An additional 0.4 dB/Km improvement is seen at 75° C. that cannot be accounted for by the cabling attenuation. It is possible that the attenuation level measured on the fiber prior to cabling included losses due to spool tension and/or buffer coating induced microbending. These losses could have been eliminated at elevated temperatures resulting in an absolute fiber attenuation of 2.8 dB/Km at 75° C.

It is assumed that temperature reductions caused increased microbending activity due to contractions of the buffer and strength members. The obvious result is an increase in attenuation. However, it is interesting to note that for the reductions below 25° C. the two curves of FIG. 5 are essentially identical. It is reasoned that the microbending performs a function similar to a mode filter substantially reducing the transient loss length. A splice loss still exists at the interface for the dashed curve launch condition, however for decreasing temperatures an EMD is quickly established resulting in data similar to that obtained from near-ideal EMD transfer.

Obviously many modifications and variations of the present invention are possible in the light of the above teachings. It is therefore to be understood that within the scope of the appended claims the invention may be practiced otherwise than as specifically described.

What is claimed is:

1. An apparatus for evaluating environmental stress effects on a test fiber optic cable comprising:
   means emitting light at one wavelength for providing an optical time domain reflectometer;
   means emitting light at a second wavelength for providing a throughput loss (insertion loss) measurement thereof:
   means emitting light at a third wavelength for providing an indication of strain on the test fiber optic cable;
   means connected to the test fiber optic cable, the optical time domain reflectometer providing means, the throughput loss (insertion loss) measurement providing means and the strain indication providing means for the optically coupling thereof;
   an equilibrium modal distribution launcher interposed between the optically coupling means and the test fiber optic cable; and
   means operatively disposed with respect to the test fiber optic cable for varying temperature, pressure or strain thereof to enable an observation of the effects thereof, the optical time domain reflectometer providing means has a laser emitting at the one wavelength, the throughput loss (insertion loss) measurement providing means has an LED emitting at the second wavelength and the strain indication providing means has a laser emitting at the third wavelength and the optically coupling means is a 3×2 port tapered fiber coupler, a first port of the 3 is optically coupled to the optical time domain reflectometer providing means, a second port of the 3 is optically coupled to the strain indication providing means, a third port of the 3 is optically coupled to the throughput loss (insertion loss) measurement providing means and a zero port of the 2 is optically coupled to the equilibrium modal distribution launcher.

2. An apparatus according to claim 1 in which the equilibrium modal distribution launcher is a length of fiber substantially the same in length and type as the test fiber optic cable.

3. An apparatus according to claim 1 further including:
   a first PIN diode/preamplifier circuit operating as a loss detector coupled to receive the output of the test fiber optic cable;
   a second PIN diode/preamplifier operating as a reference detector coupled to a number four port of the 2 of the 3×2 port tapered fiber coupler to receive energy from the LED of the throughput loss (insertion loss) measurement providing means at the second wavelength.

4. An apparatus according to claim 3 further including:
   a first lock-in amplifier connected to the first PIN diode/preamplifier connected to reject the frequency of the laser of the optical time domain relectometer;
   a second lock-in amplifier connected to the second PIN diode/preamplifer;
   a ration meter coupled to the first and second lock-in amplifier to give an indication to allow the dividing out of source fluctuations of the LED; and
   a dB meter coupled to the ratio meter to give an indication of the dB change in the test fiber cable output power.

5. An apparatus according to claim 4 further including:
   mode strippers provided at an input end and output end of the test fiber optic cable to avoid launching/detecting cladding light into/out of the fiber.

6. An apparatus according to claim 5 further including:
   a computer having a plotter and visual display for showing the environmental stress effects on the test optic fiber.

7. An apparatus according to claim 6 in which the computer-plotter-display is correlated to the varying means.

* * * * *